(12) United States Patent
Lowe

(10) Patent No.: US 7,481,446 B2
(45) Date of Patent: Jan. 27, 2009

(54) FOLDING WHEELBARROW

(76) Inventor: Matthew F. Lowe, 7256 Walling La., Dallas, TX (US) 75231

( * ) Notice: Subject to any disclaimer, the term of this patent is extended or adjusted under 35 U.S.C. 154(b) by 0 days.

(21) Appl. No.: 11/818,419

(22) Filed: Jun. 13, 2007

(65) Prior Publication Data

US 2007/0241538 A1 Oct. 18, 2007

Related U.S. Application Data

(63) Continuation of application No. 11/055,458, filed on Feb. 10, 2005, now Pat. No. 7,243,939.

(51) Int. Cl.
*B62B 1/00* (2006.01)

(52) U.S. Cl. ............... 280/653; 280/42; 280/43.1; 280/47.31

(58) Field of Classification Search ............ 280/40, 280/42, 47.131, 47.17, 47.18, 47.3, 47.31, 280/639, 645, 646, 651, 652, 653, 654
See application file for complete search history.

(56) References Cited

U.S. PATENT DOCUMENTS

| | | | | |
|---|---|---|---|---|
| 2,422,331 A | * | 6/1947 | Bates | 280/42 |
| 2,471,462 A | * | 5/1949 | Toth | 280/653 |
| 2,494,199 A | | 1/1950 | Provitola et al. | |
| 2,772,890 A | * | 12/1956 | Gastright | 280/40 |
| 2,800,335 A | * | 7/1957 | Clapp | 280/42 |
| 2,901,263 A | * | 8/1959 | Van Loon, Jr. | 280/47.31 |
| 3,552,760 A | * | 1/1971 | Sine | 280/653 |
| 3,931,985 A | * | 1/1976 | Knebel | 280/42 |
| 4,198,069 A | * | 4/1980 | O'Brian et al. | 280/42 |
| 4,781,396 A | * | 11/1988 | King | 280/653 |
| 5,222,757 A | * | 6/1993 | Magyar | 280/653 |
| 5,433,462 A | * | 7/1995 | Groleau | 280/38 |
| 6,017,053 A | * | 1/2000 | Leger et al. | 280/653 |
| 6,186,523 B1 | * | 2/2001 | Aielli | 280/47.31 |
| 6,902,184 B2 | * | 6/2005 | Hsu | 280/653 |
| 2003/0034620 A1 | * | 2/2003 | Allsop et al. | 280/42 |
| 2004/0155419 A1 | * | 8/2004 | Gardenour | 280/47.131 |
| 2005/0035565 A1 | * | 2/2005 | Hsu | 280/47.31 |

FOREIGN PATENT DOCUMENTS

| | | | |
|---|---|---|---|
| GB | 2051692 A | | 1/1981 |
| GB | 2051692 A | * | 1/1981 |

* cited by examiner

*Primary Examiner*—Christopher P Ellis
*Assistant Examiner*—Katy Meyer
(74) *Attorney, Agent, or Firm*—Gardere Wynne Sewell, LLP

(57) ABSTRACT

A folding wheelbarrow includes opposed tubular perimeter frame sections each connected to a support wheel and joined to each other at a point along rearward edges thereof by a hinge pin. Integral handlebar sections extend rearwardly from the frame sections and are connected to handgrips which may be selectively positioned for comfort and use by a human operator. A flexible load carrying container is secured to the frame sections. A single wheel embodiment includes perimeter frame members which may be joined by pivot pins supported on a fork structure or by a hinge connection at a single hinge pin also connected to a wheel fork structure.

12 Claims, 5 Drawing Sheets

US 7,481,446 B2

FOLDING WHEELBARROW

This application is a continuation of prior copending application Ser. No. 11/055,458, filed on Feb. 10, 2005, now U.S. Pat. No. 7,243,939.

BACKGROUND OF THE INVENTION

Wheelbarrows are ubiquitous as devices convenient for transporting cargos of many types. A longstanding problem in the art of wheelbarrows is the provision of a suitable wheelbarrow which may be folded to minimize the space required for storage or transport. Although several types of folding wheelbarrows have been developed, at least in the patent literature, there has been a continuing need to provide a folding wheelbarrow which is truly lightweight, aesthetically pleasing, easy to handle and stable when in use to transport a load. Still further, there has been a need in the art of folding wheelbarrows to provide a wheelbarrow design which is economical to manufacture and market while satisfying the requirements for a wheelbarrow for typical homeowner usage, for example. It is to meet the desiderata for folding wheelbarrows that the present invention has been developed.

SUMMARY OF THE INVENTION

The present invention provides an improved folding wheelbarrow.

In accordance with one aspect of the present invention, a folding wheelbarrow is provided which includes a lightweight tubular frame which may be fabricated in sections which are easily connected to each other at a hinge structure and provide a suitable support for a container section of the wheelbarrow. The container section may be formed as a separate member supported by the tubular frame sections or at least partly joined to or formed with the tubular frame members. The tubular frame sections may be formed of metal or molded plastic members and may be of solid or tubular cross section configuration. The proportions of the frame sections may vary, but preferred embodiments are disclosed.

The present invention also provides a folding wheelbarrow which has improved stability. Opposed frame sections are pivotally connected to each other at a rearward or midpoint part of the frame and the tubular frame sections may each include integral handle parts. Each frame section is also provided with a support wheel whereby, in a working position of the wheelbarrow, the support wheels are spaced apart to provide a wheelbarrow having substantial stability.

The present invention further provides a folding wheelbarrow which is characterized by tubular frame sections which may include rigid or flexible container wall parts secured thereto and whereby further container wall parts, including a bottom or backwall part or a bottom and front wall part, may be formed of fabric or other flexible sheetlike material to allow the wheelbarrow frame sections to be moved toward each other to a collapsed or folded position of the wheelbarrow.

Those skilled in the art will further appreciate the above-mentioned advantages and superior features of the invention upon reading the detailed description which follows in conjunction with the drawings.

DETAILED DESCRIPTION OF THE PREFERRED EMBODIMENTS

Figure 1:
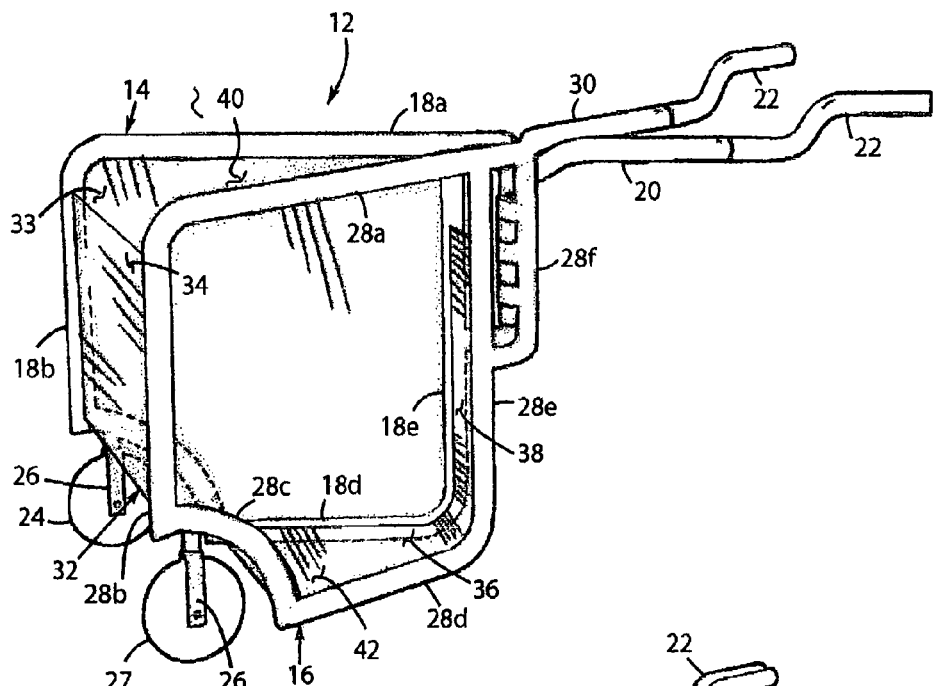
FIG. 1 is a perspective view of one preferred embodiment of a folding wheelbarrow in accordance with the invention showing the wheelbarrow in an open, working position.

In the description which follows like parts are marked throughout the specification and drawing with the same reference numerals, respectively. The drawing figures are not necessarily to scale and certain elements may be shown in somewhat schematic or generalized form in the interest of clarity and conciseness.

Figure 5:
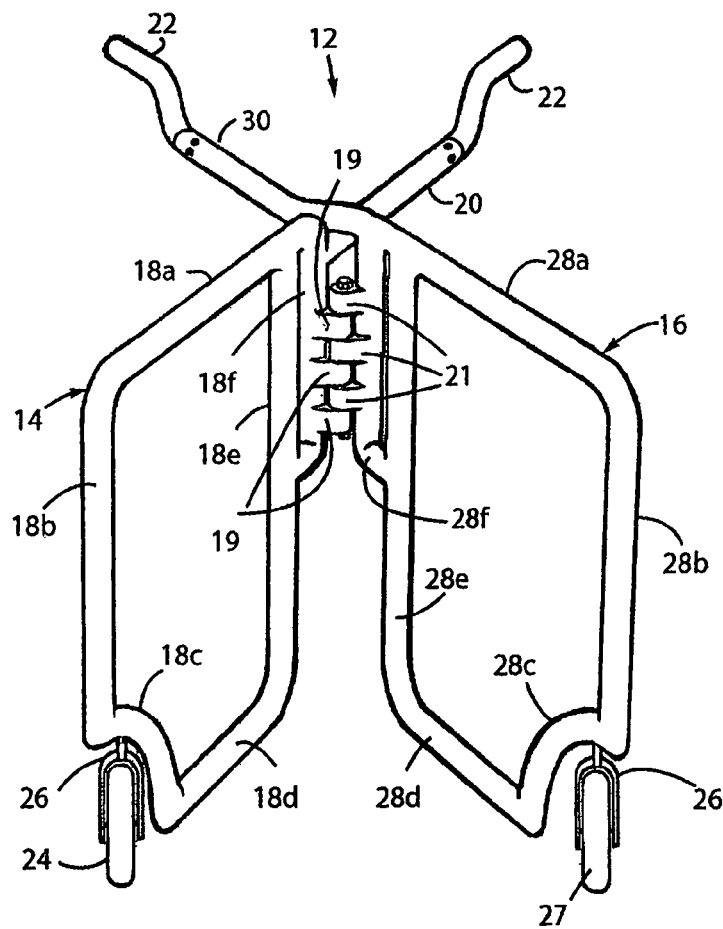
FIG. 5 is a perspective view of the wheelbarrow shown in FIGS. 1 through 3 sans the container part and illustrating certain details of the hinge connection between the frame sections.

Referring to FIGS. 1 and 5, there is illustrated a folding wheelbarrow in accordance with the invention and generally designated by the numeral 12. The wheelbarrow 12 is characterized by opposed perimeter frame sections 14 and 16 which are similar in construction and are of generally similar configuration. Frame section 14 includes a steel, aluminum or injection molded plastic tubular perimeter frame including a horizontal top member 18a, a front vertical member 18b, an arcuate intermediate member 18c, a generally horizontal extending bottom member 18d and a rear vertical member part 18e. A somewhat L-shaped hinge support part 18f, see FIG. 5, is joined to the members 18a and 18e. An integral handlebar extension part 20 extends rearwardly from the frame section 14 and is generally parallel to but slightly offset from the top member 18a. A tubular offset handlebar or hand grip part 22 is connected to the handlebar part 20 and is rotatable relative thereto to a selected number of working positions. Frame section 14 supports a wheel 24 adjacent the arcuate member 18c by a suitable, inverted U-shaped support bracket 26. Wheel 24 is canted with respect to the plane of the frame section 14 so that when the wheelbarrow 12 is in an open and working position as shown in FIGS. 1 and 5, wheel 24 and a corresponding wheel 27 connected to frame section 16 are substantially parallel to each other.

Frame section 16 is substantially like frame section 14 and includes a generally tubular horizontal top member 28a, a front vertical member 28b, see FIGS. 1 and 5, an arcuate intermediate member 28c providing clearance for the wheel 27 and integrally joined to a horizontal bottom member 28d. A vertical rear member 28e is integrally joined to bottom member 28d and to top member 28a. Moreover, frame section 16 also includes a somewhat L-shaped hinge support part 28f joined to rear member 28e and to a rearwardly extending generally horizontal handlebar section 30 of frame section 16.

A rotatable handgrip 22 is also suitably connected to the distal end of handlebar section 30 in the same manner as a hand grip 22 is connected to handlebar section 20. Handgrips 22 may each be supported by the handlebar sections 20 and 30 for rotation to respective locked positions at different heights and spacings so that a person using the wheelbarrow 12 may find a comfortable position of the handgrips. For example, the handgrips 22 may be suitably adapted to extend within the tubular handlebar sections 20 and 30 and provided with suitable spring biased detents to lock the handgrips in selected working positions with respect to the handlebar sections 20 and 30, respectively.

Figure 2:
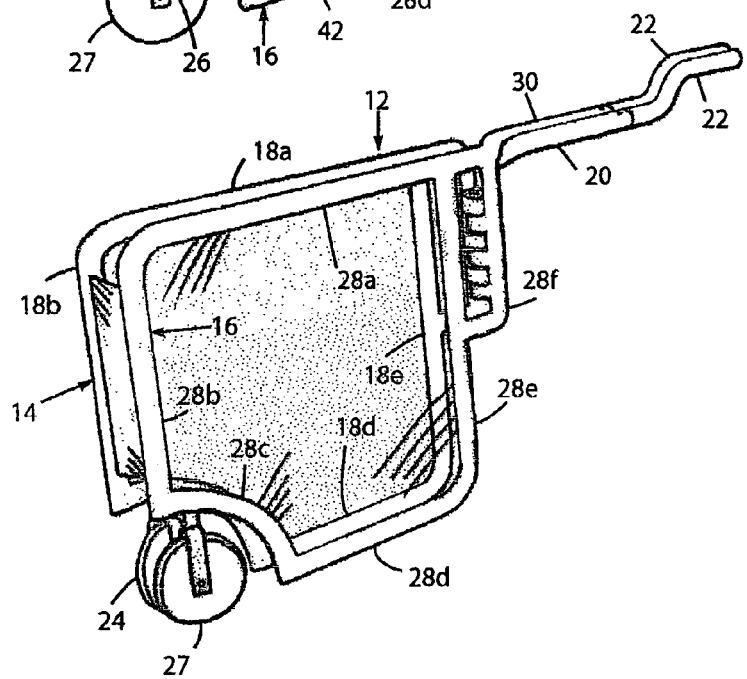
FIG. 2 is a perspective view of the wheelbarrow shown in FIG. 1 in a folded position.
Figure 3:
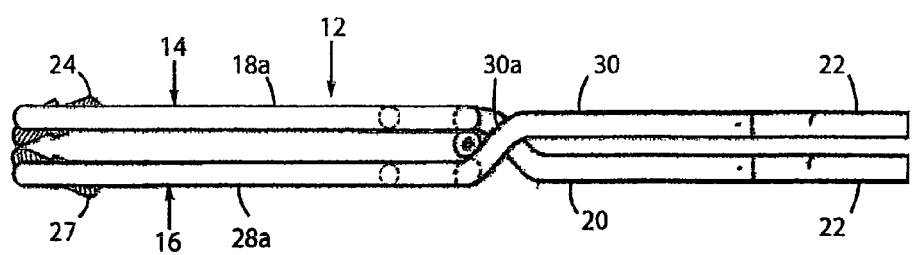
FIG. 3 is a top plan view of the wheelbarrow shown in FIGS. 1 and 2 in the folded position.
Figure 6:
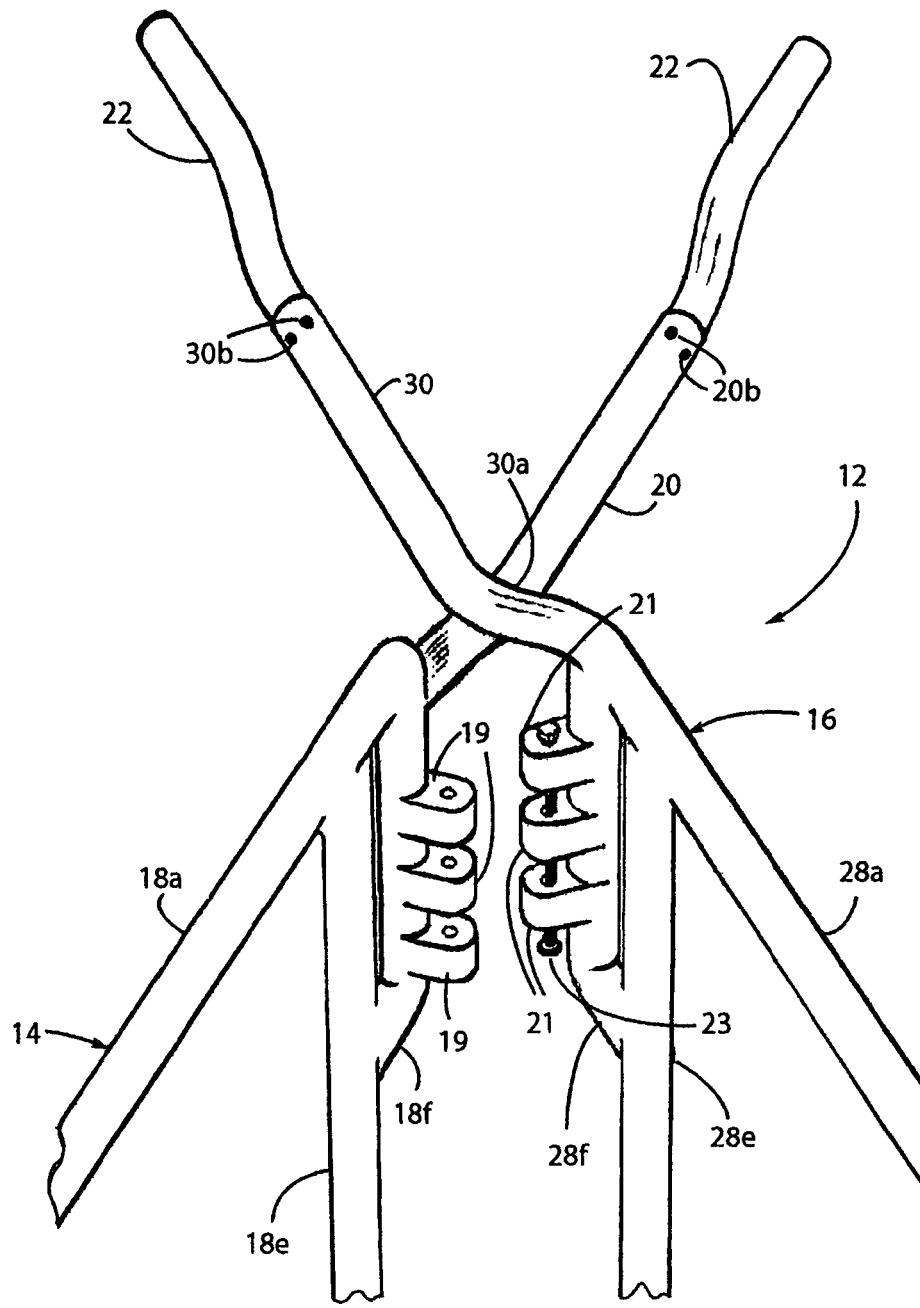
FIG. 6 is a detail perspective view on a larger scale showing the frame sections of the wheelbarrow illustrated in FIG. 5 separated from each other.

As shown in FIGS. 5 and 6, and more particularly FIG. 6, the hinge support members 18*f* and 28*f* are provided with respective sets of spaced apart hinge bosses 19 and 21 which are operable to be interleaved as shown in FIG. 5, and connected to each other by an elongated hinge pin :23, FIG. 6. Accordingly, the frame sections 14 and 16 may be pivoted between the open working position shown in FIGS. 1 and 5 to a collapsed or folded position as shown in FIGS. 2 and 3. As mentioned previously, in the open and working position of the wheelbarrow 12, the support wheels 24 and 27 are substantially parallel to each other to facilitate ease of moving the wheelbarrow 12 in use.

Figure 4:
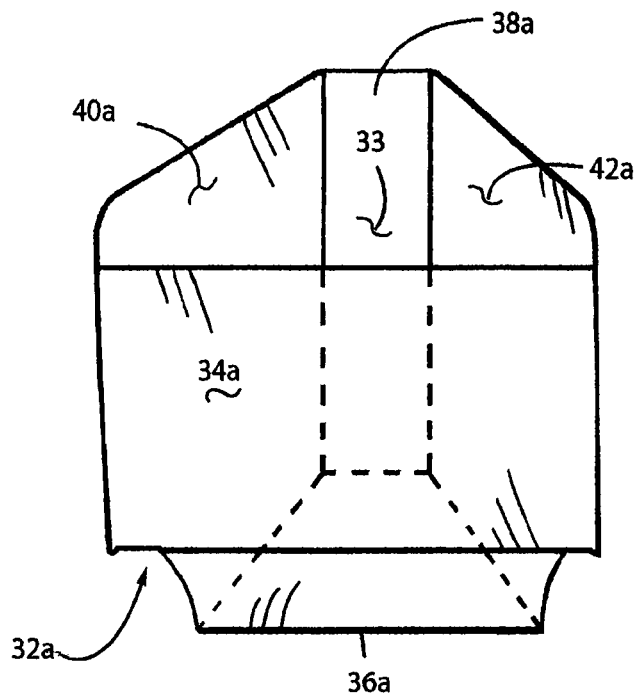
FIG. 4 is a perspective view of a separate container for the folding wheelbarrow shown in FIGS. 1 through 3.

Referring again to FIG. 1, the wheelbarrow 12 may be provided with an open top container, generally designated by the numeral 32 and defining a container load carrying space 33. Container 32 includes a flexible front wall 34 extending between the frame members 18*b* and 28*b*. A container bottom wall 36 is integrally joined to the front wall 34 and extending from the front wall along and secured to the frame members 18*c*, 28*c*, 18*d* and 28*d* and then integrally joined to a container backwall 38 similarly integrally joined or otherwise secured to the vertical rear frame members 18*e* and 28*e*. The container 32 is shown in FIG. 1 as a somewhat transparent structure to facilitate viewing the overall structure of the wheelbarrow 12. The container 32 may include flexible or rigid sidewalls 40 and 42, the sidewall 40 filling the space between the perimeter frame members 18*a*, 18*b*, 18*c*, 18*d* and 18*e* and being integrally formed with or otherwise secured to such members. In like manner, container wall 42 may be integrally joined to and contiguous with frame perimeter members 28*a*, 28*b*, 28*c*, 28*d* and 28*e*. Accordingly, the flexibility of the walls 34, 36 and 38 allow the frame sections 14 and 16 to be folded toward each other or separated a limited distance from each other in the manner illustrated in FIGS. 2 and 1. However, since container walls 40 and 42 do not require to be folded they may be flexible or rigid, as desired. The walls of container 32 may be formed of a suitable fabric of natural or synthetic fibers or other suitably flexible sheet-like material. Alternatively, as shown in FIG. 4, a separate flexible or rigid open top container 32*a* may be adapted to be suitably connected to the frame sections 14 and 16. Container 32*a* includes a front wall 34*a* joined to a bottom wall 36*a* which is also joined to a back wall 38*a*. Walls 34*a*, 36*a* and 38*a* are also joined to sidewalls 40*a* and 42*a*, respectively. Container 32*a* may be suitably secured to the perimeter frame sections 14 and 16 and disconnected therefrom, if desired, when the wheelbarrow 12 is moved to a folded or collapsed position.

FIGS. 3 and 6 illustrate how the handlebar sections 20 and 30 are offset from the plane of the perimeter frame sections 14 and 16 so that these handlebar sections cooperate with each other when the frame sections 14 and 16 are connected at the hinge formed by the hinge bosses 19 and 21 and the hinge pin 23. For example, handlebar section 20 is secured to or formed integral with top frame member 18*a* at a point lower than a major portion of the top member 18*a* and then may be bent upwardly and extended rearwardly so that it will not interfere with handlebar section 30. Handlebar section 30 is joined to top member 28*a* at a somewhat S-shaped curved portion 30*a* so as to be properly aligned with handlebar section 20 in both the working and folded positions, as illustrated in the drawings. As shown in FIG. 3, handlebar sections 20 and 30 are essentially parallel to each other in a folded position of the wheelbarrow 12. FIG. 6 also illustrates the location of selected detent openings in the tubular handlebar sections 20 and 30, as indicated by the numerals 20*b* and 30*b*. Suitable spring biased ball detents, not shown, may be mounted on the handgrips 22 and which register with selected ones of the openings 20*b* and 30*b* in selected working position of the handgrips with respect to the handlebar sections 20 and 30, respectively.

As mentioned previously, the wheelbarrow 12 may be constructed of lightweight steel or aluminum or plastic tubing to provide the frame sections 14 and 16, the handlebar sections 20 and 30 and the handgrips 22, for example. The frame sections 14 and 16 may be moved between positions extending in planes forming an included angle of about 45° to a generally collapsed or folded position substantially parallel to each other as shown in FIG. 3 and having a folded width of only about 6.0 inches for example, for a wheelbarrow having an overall height of about 2.50 feet and an overall length of about 5.0 feet. As also mentioned earlier, the containers 32 or 32*a* may be formed of waterproof canvas, Dacron or a semi-rigid material in the case of container 32*a* if the container 32*a* is intended to be completely removed from the wheelbarrow frame. The wheels 24 and 27 may be about 8.0 inches in diameter and fixed to the frame members 14 and 16 at angles of about 22° from the plane of the frame sections formed by the members 18*a*, 18*b*, 18*c*, 18*d* and 18*e* for frame section 14 and members 28*a*, 28*b*, 28*c*, 28*d* and 28*e* for frame section 16.

The wheelbarrow 12 is advantageous in that the wheelbarrow has a container capacity comparable to other styles of wheelbarrows, if not greater capacity, and thanks to the configuration of the frame sections 14 and 16 which are pivotally connected to each other at a rearward position or otherwise at a position between the points of attachment of the wheels 24 and 27 and the handgrips 22, a more stable structure is realized. Still further, by distributing the load of the wheelbarrow 12 between two wheels spaced apart substantially, as indicated from the drawings, when the wheelbarrow 12 is in a working condition, ease of traversing the wheelbarrow 12 over rough terrain is realized and the unit pressure exerted by the wheelbarrow 12 on the surface on which it is supported is reduced, thanks to distribution of the weight of the wheelbarrow between the wheels 24 and 27. In the folded or working positions of frame sections 14 and 16, the frame members 18*d* and 28*d* rest easily on the ground in stable positions. Wheels 24 and 27 may be conventional wheelbarrow wheels, either pneumatic tired or solid, and supported on conventional bearings in a manner known to those skilled in the art.

Figure 7:
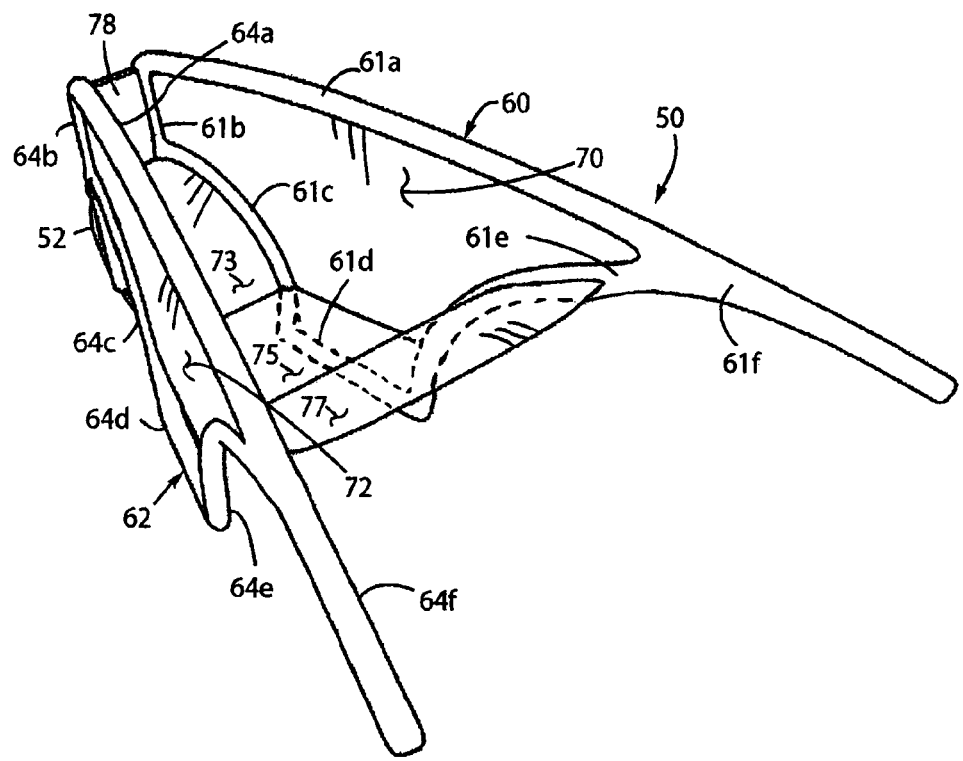
FIG. 7 is a perspective view of another preferred embodiment of a folding wheelbarrow in accordance with the invention.
Figure 8:
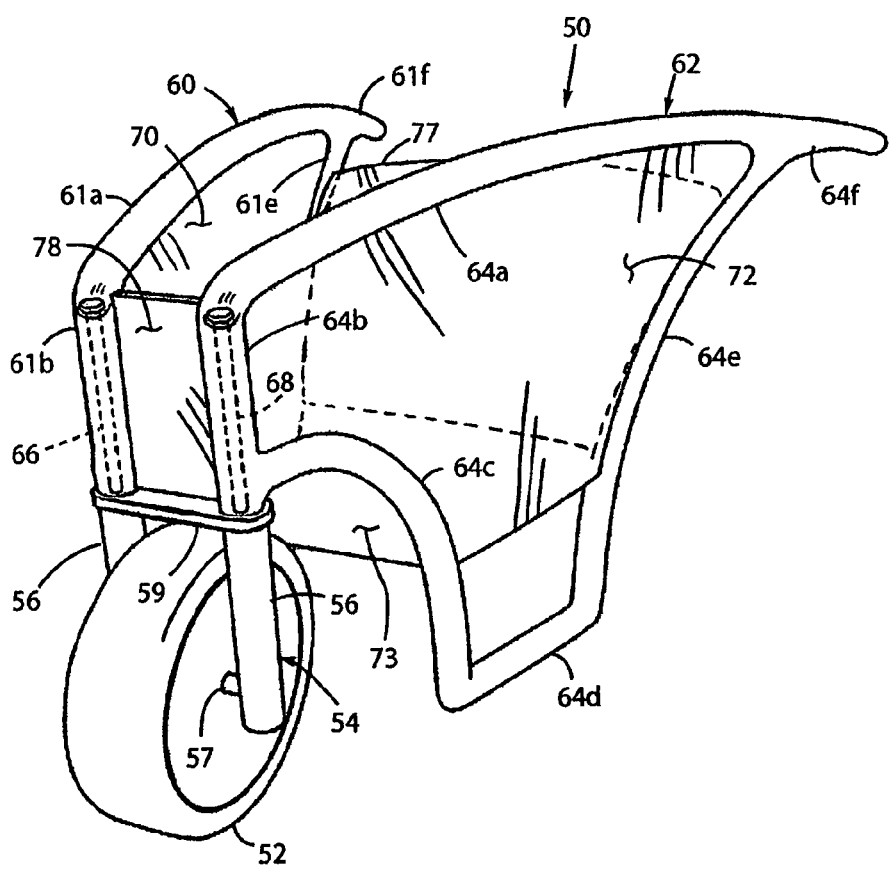
FIG. 8 is a perspective view taken from a different direction of the wheelbarrow shown in FIG. 7.

Referring now to FIGS. 7 and 8, another preferred embodiment of a folding wheelbarrow in accordance with the invention is illustrated and generally designated by the numeral 50. The wheelbarrow 50 is characterized by a single support wheel 52 which may be of conventional construction and supporting a fork member 54 having spaced apart depending tines 56 suitably connected to a wheel support axle 57, FIG. 8, and also interconnected by a web 59. Wheelbarrow 50 includes spaced apart perimeter frame sections 60 and 62 which are virtually identical and are preferably formed of continuous tubular parts. Frame section 62 is shown in full view and frame section 60 may be essentially identical. Frame section 62 includes a somewhat arcuate tubular top member 64a, a vertical front member 64b, an arcuate intermediate member 64c, a bottom member 64d and an arcuate rear member 64e. An integral handgrip 64f extends rearwardly from the juncture of perimeter members 64a and 64e. Each of the members 64a, 64b, 64c, 64d and 64e may be formed of tubular parts integrally joined to form a continuous perimeter frame. Perimeter frame section 60 is, as mentioned, essentially identical and is characterized by integrally joined members 61a, 61b, 61c, 61d and 61e, as shown in FIG. 7.

Perimeter frame sections 60 and 62 are secured to web 59 of fork 54 by elongated pivot pins 66 and 68 which are secured to web 59 of fork 54 spaced apart and parallel to each other and to the respective front frame members 64b and 61b of the frame sections 62 and 60. The frame sections 60 and 62 may be pivoted with respect to fork 54 about the longitudinal axes of pins 66 and 68 between an open, working position of wheelbarrow 50, as illustrated in FIGS. 7 and 8, and a substantially collapsed or folded position wherein handlebar or handgrip parts 61f and 64f are brought close together. Frame bottom members 61d and 64d provide stable ground engaging supports for wheelbarrow 50.

The container part of the wheelbarrow 50 may comprise fabric or rigid panel members 70 and 72 suitably secured to the perimeter frame sections 60 and 62 in a manner similar to the manner in which the container wall parts 40 and 42 are secured to the frame sections 14 and 16 of the wheelbarrow 12. However, a continuous flexible bottom wall, comprising wall parts 73, 75, 77, see FIG. 7, is also joined to the perimeter frame sections 60 and 62 to form part of the container. Container wall parts 73 and 77 extend along frame wall members 61c and 64c and frame members 61e and 64e, respectively, and container bottom wall part 75 extends between wall parts 73 and 77 and between container walls 70 and 72. A front vertical container wall part 78, FIGS. 7 and 8, closes the front of the container of the wheelbarrow 50. At least container wall parts 73, 75, 77 and 78 are flexible and may be formed of a suitable fabric or other flexible sheetlike material, for example.

Figure 9:
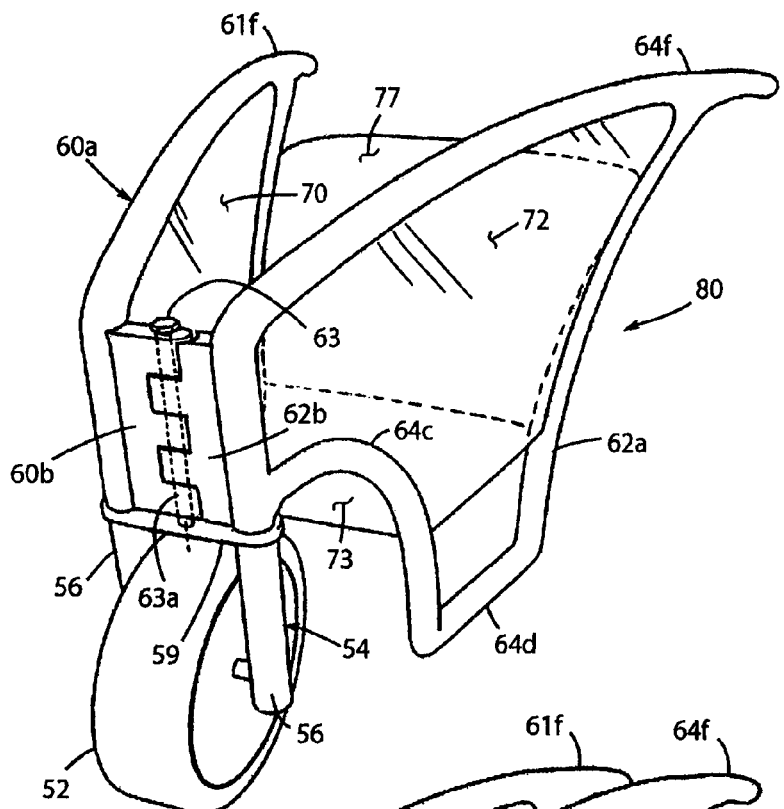
FIG. 9 is a perspective view of still another preferred embodiment of a folding wheelbarrow in accordance with the invention.
Figure 10:
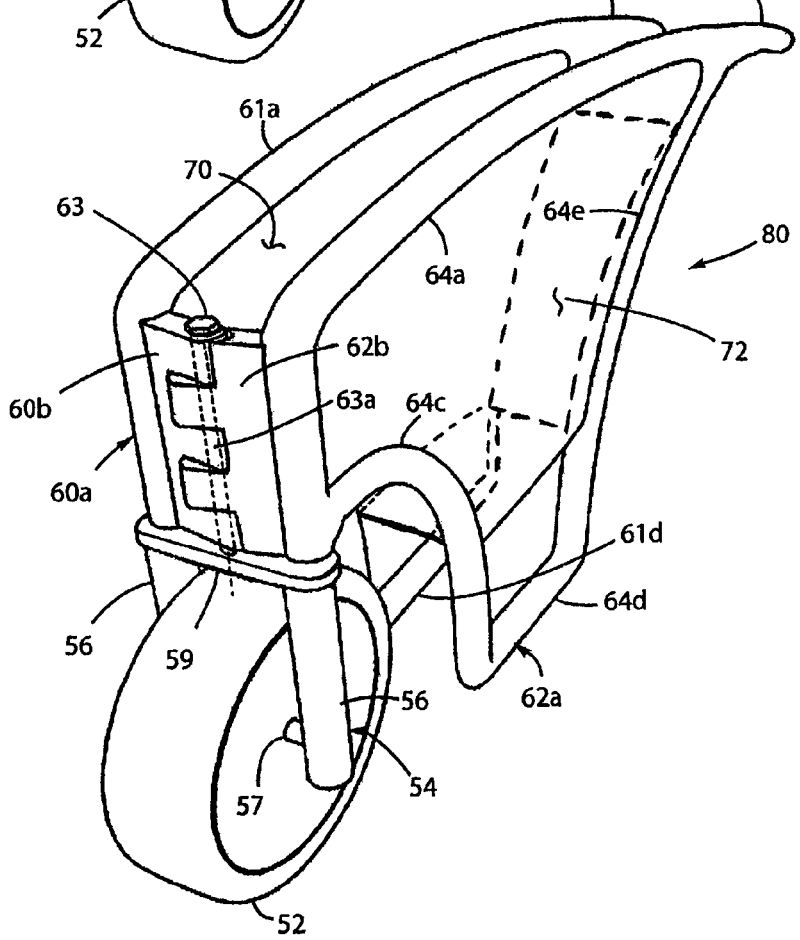
FIG. 10 is a perspective view of the wheelbarrow shown in FIG. 9 but in the folded position.

Referring now to FIGS. 9 and 10, another embodiment of a wheelbarrow in accordance with the invention is illustrated and generally designated by the numeral 80. Wheelbarrow 80 may utilize many parts of the wheelbarrow 50, as indicated by the reference numbers applied to the parts of wheelbarrow 80, as shown. However, the opposed frame sections are modified at least slightly, are designated by the numerals 60a and 62a and are provided with cooperating hinge members 60b and 62b which are interconnected by a hinge pin 63. Hinge pin 63 is secured to fork 54 at web part 59. In this way the frame sections 60a and 62a may pivot about longitudinal axis 63a of hinge pin 63 instead of about the axes of support pins 66 and 68, as with the wheelbarrow 50 illustrated in FIGS. 7 and 8. FIG. 10 shows the wheelbarrow 80 in the folded, nonworking condition, while FIG. 9 shows the wheelbarrow 80 in an open working position.

The construction and operation of the wheelbarrow embodiments shown in FIGS. 1 through 10 and described herein is believed to be within the purview of one skilled in the art based on the foregoing descriptions. Conventional engineering materials and methods may be used to construct the folding wheelbarrows 12, 50 and 80. Although preferred embodiments of the invention have been described in detail, those skilled in the art will also recognize that various substitutions and modifications may be made without departing from the scope and spirit of the appended claims.

What is claimed is:

1. A folding wheelbarrow comprising:
opposed frame sections interconnected for pivotal movement with respect to each other between a working position of a container of said wheelbarrow and a folded position, respectively;
a single support wheel supporting said frame sections;
a fork member including a web and opposed depending tines connected to said web and said wheel;
said frame sections being pivotally connected to said fork member, respectively;
said frame sections are defined by perimeter members;
handgrips connected to respective ones of said frame sections; and
container wall parts disposed on each of said frame sections to form sidewalls for said container;
said frame sections are formed of substantially continuous integrally joined tubular members defining top, front, bottom and rear frame members, respectively.

2. The wheelbarrow set forth in claim 1 wherein:
said frame sections are connected to said fork member by spaced apart pivot pins, respectively.

3. The wheelbarrow set forth in claim 1 wherein:
said frame sections are interconnected by a hinge including opposed hinge members and a hinge pin connected to said hinge members and to said fork member.

4. The wheelbarrow set forth in claim 1 wherein:
said sidewalls are substantially rigid and fill a space delimited by said perimeter members of said frame sections, respectively.

5. The wheelbarrow set forth in claim 4 wherein:
said container includes a front wall, a bottom wall and a backwall disposed between said frame sections.

6. The wheelbarrow set forth in claim 5 wherein:
said front wall, said bottom wall and said backwall are formed of a flexible material to allow said frame sections to be moved toward and away from each other to place said wheelbarrow in a folded position and a working position, respectively.

7. The wheelbarrow set forth in claim 1 wherein:
said handgrips are integrally joined to said tubular members, respectively.

8. A folding wheelbarrow comprising:
opposed frame sections interconnected for pivotal movement with respect to each other between a working position of a container of said wheelbarrow and a folded position, respectively;
a single support wheel supporting said frame sections;
a fork member including a web and opposed depending tines connected to said web and said wheel;
said frame sections being pivotally connected to said fork member at said web, respectively;
said frame sections are defined by integral tubular perimeter members, respectively;
handgrips connected to respective ones of said frame sections;
container walls disposed on each of said frame sections to form sidewalls for said container; and
said container includes a front wall, a bottom wall and a backwall formed of a flexible material and disposed between said frame sections.

9. The wheelbarrow set forth in claim 8 wherein:
said handgrips are integrally joined to said tubular members, of said frame sections, respectively.

10. The wheelbarrow set forth in claim 8 wherein:
said frame sections are connected to said fork member by spaced apart pivot pins, respectively.

11. The wheelbarrow set forth in claim 8 wherein:
said frame sections are interconnected by a hinge including opposed hinge members and a hinge pin connected to said hinge members and to said fork member.

12. The wheelbarrow set forth in claim 8 wherein:
said sidewalls are substantially rigid and fill a space delimited by said perimeter members of said frame sections, respectively.

* * * * *